United States Patent [19]

Armour et al.

[11] Patent Number: 4,541,804

[45] Date of Patent: Sep. 17, 1985

[54] TRAINING INTERFACE DEVICE FOR DISPENSING STORES

[76] Inventors: Charles R. Armour, 10016B Spearfish, Ellsworth AFB, S. Dak. 57706; Robert R. Domke, 4982 Birch Acres Rd., Oscoda, Mich. 48750; Richard J. Spero, PSC Box 2293, Pease Air Force Base, N.H. 03801

[21] Appl. No.: 488,901

[22] Filed: Apr. 27, 1983

[51] Int. Cl.[4] .............................................. G09B 9/08
[52] U.S. Cl. ...................................................... 434/15
[58] Field of Search .................. 434/14, 15; 89/1.5 F, 89/1.5 G, 1.5 E, 1.5 R, 1.5 J

[56] References Cited

U.S. PATENT DOCUMENTS

| | | | |
|---|---|---|---|
| 2,470,468 | 5/1949 | Buchanan | 434/15 |
| 2,991,700 | 7/1961 | Sholtz | 89/1.5 |
| 3,216,322 | 11/1965 | Wenger et al. | 89/1.5 |
| 3,779,129 | 12/1973 | Lauro | 85/1.5 E |
| 3,923,275 | 12/1975 | Dexter et al. | 244/137 R |
| 4,049,222 | 9/1977 | Peterson | 244/137 R |
| 4,257,639 | 3/1981 | Stock | 294/83 R |

OTHER PUBLICATIONS

AF Technical Order 1F-111(B)A-2-11-1.

*Primary Examiner*—Richard C. Pinkham
*Assistant Examiner*—Vincent A. Mosconi
*Attorney, Agent, or Firm*—Donald J. Singer; Stanton E. Collier

[57] ABSTRACT

A training interface device is connected to the output end of a store rack cable and to a modified store dispenser cable. Relays within the training interface device provide for proper indicator illumination in the cockpit of a military aircraft practicing nuclear store bombing. The training interface device further allows the use of standard practice bombs rather than expensive nuclear drop shapes.

2 Claims, 4 Drawing Figures

TRAINING INTERFACE DEVICE FOR DISPENSING STORES

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to training of flight crews to employ proper switchology when practicing nuclear store bombing. In particular, it relates to a training interface device, an electrical circuit, used in a training mode that presents to a flight crew proper cockpit indications of bombs away using standard practice bombs rather than expensive nuclear drop shapes.

Although the training with expensive nuclear drop shapes provided proper cockpit indications, the flight crew used military technical orders rather than training checklists to release the nuclear drop shapes. The problems inherent in this design are (1) the failure to provide "real world" training, (2) the use of "for training only" checklists, and (3) the use of expensive nuclear drop shapes to actuate the present system.

The prior connections in the wing pylon electrical system had a cable connected to a store dispenser and to a store rack being independent electrically of one another. The dispenser cable provided lines for electrical ground and for a fire pulse to a stepper that released the next available store on that dispenser. The rack cable provided other lines such as power upon station select; power upon selection of store release, nuclear option select, and nuclear consent; identification of store present, nuclear monitor power, and electrical grounds. The use of these cables in the normally intended manner caused the problems noted above and thus motivated the search for alternative devices for providing as realistic training as possible at a minimum of expense.

SUMMARY OF THE INVENTION

The present invention overcomes the problems encountered in the past and described in detail hereinabove by providing a training interface device which is capable of providing proper indications in the cockpit in response to nuclear switchology used in the FB-111A.

In practice one or more store is attached to the dispenser, and upon receiving a firing pulse, the stepper motor in the dispenser advances to the next available store whereupon an ignition cartridge explodes after receiving the firing pulse and clears the store from the dispenser. The dispenser is attached to the rack which is attached to the aircraft pylon that has additional electronics therein. Electrical signals including power and ground are fed to the dispenser through the training device.

By proper design the training device unit that is placed between the output end of the rack cable and the input end of the dispenser cable makes it possible (1) to activate actual release indicators, lamps, to give realism to training; (2) to release from the aircraft standard practice stores while performing normal nuclear training missions; (3) to use a single checklist for both real world and training; (4) to provide greater crew coordination; and (5) to develop confidence that the systems work.

In order to provide the above, a plurality of relays are interconnected to the different lines in the rack cable and the dispenser cable so that normal signals reach the dispenser and normal nuclear store release signals are returned to the aircraft system for giving the indications desired.

The primary function of the invention is to allow normal dispenser signals to pass through the training interface device and to return through the training interface device signals that cause proper indication of a nuclear store release. The lines in these cables are noted above.

A first relay simulates the unlocking of a solenoid in the store rack that allows the rack fire pulse to pass to the dispenser and the applying of power to the store rack. A second relay in the interface provides electrical contacts like a sensing switch in the store rack that gives store present and away indications in the cockpit. A third relay controls the length of time that the lights associated with stores away remain out and a fourth relay delays power to the second relay to allow the rack fire pulse to build to a maximum to guarantee that the ignition cartridge explodes properly.

It is therefore one object of this invention to provide for a training interface device that actuates proper indicators in response to a practice store release simulating a nuclear store; and It is a further object of this invention to provide for a training interface device that allows standard practice bombs to be used in place of practice nuclear drop shapes.

These and other objects and advantages of the present invention will be readily apparent to one skilled in the pertinent art from the following detailed description of a preferred embodiment of the invention and related drawings.

DETAILED DESCRIPTION OF THE PREFERRED EMBODIMENT

Figure 1:
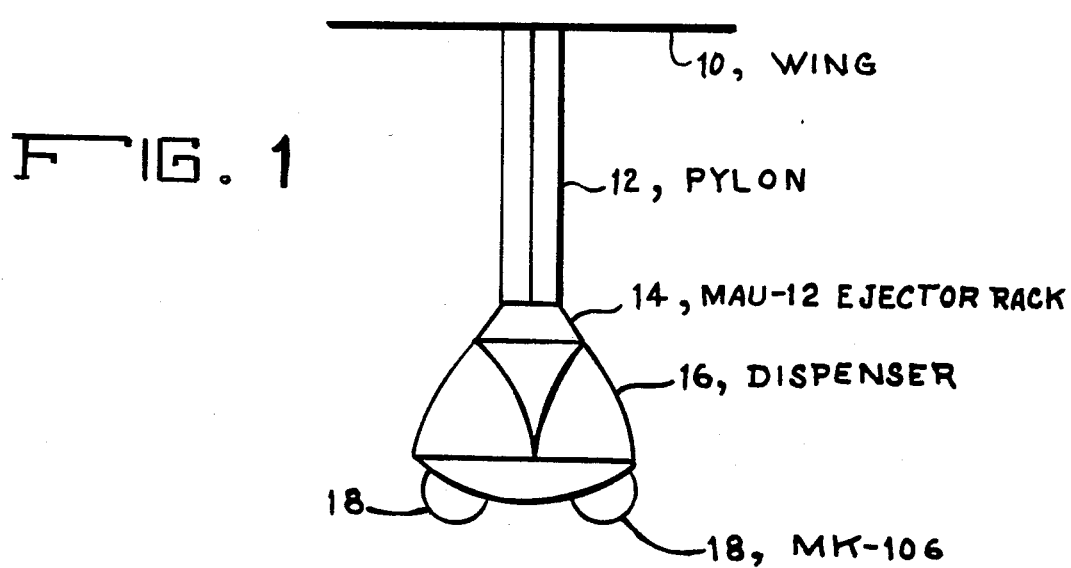
FIG. 1 illustrates by elevation view a wing pylon with a rack and dispenser with stores attached.

Referring to FIG. 1, a wing 10 of an aircraft, not shown, such as a FB-111A, has attached thereon a conventional pylon 12 with a store rack 14 attached to pylon 12 in a conventional manner. A conventional store dispenser 16 is attached to rack 14 and attached thereon is a plurality of conventional stores 18.

Because of the previous design, indicators such as bombs away did not function properly in a training mission and other limitations were encountered that made practice missions very unrealistic. For example, previously, actual stores release lamps did not actuate and a training checklist was used to ensure proper bombs away. It should be appreciated that releasing a nuclear weapon requires a highly complicated checklist in reality. In order to provide realistic training, an actual checklist should be used and further all indicators should function as in a nuclear release. This provides the greatest degree of confidence in the system.

Figure 2:
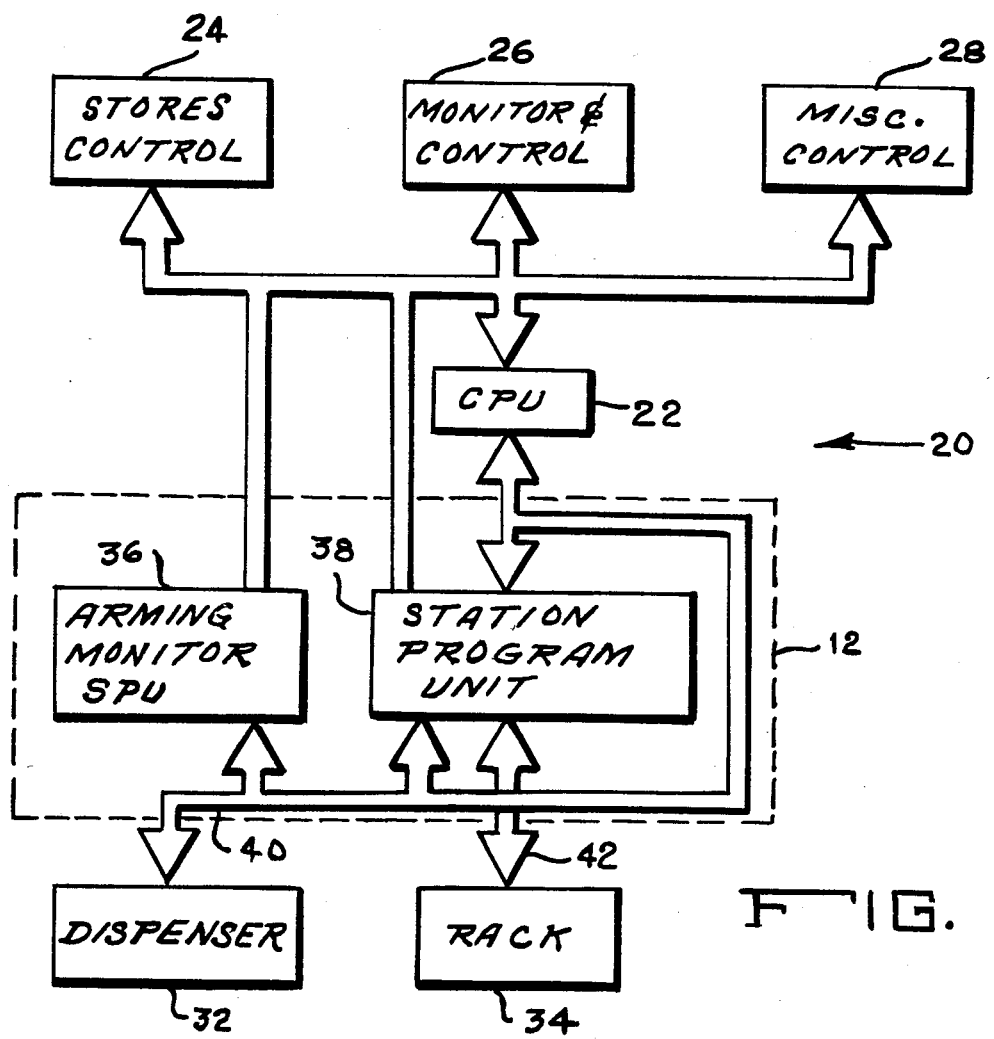
FIG. 2 illustrates by functional block diagram a conventional electronic system used to release and monitor nuclear stores.

Referring to FIG. 2, an overall release system 20 is shown in block diagram. A stores control panel 24 includes a plurality of switches and monitors (not shown) such as an enable control switch, a delivery mode selector of a weapon, a weapon selector such as nuclear, a station selector referring to weapon location, a release enable and a weapon release; a monitor and control panel 26 includes, for example, a safe indicator, an unlock indicator, an arm indicator, a burst option selector, and a monitor/release indicator for the station selected on stores control panel 24; and a miscellaneous control panel 28 includes a nuclear consent selector. These controls when operated in proper sequence as required by a checklist and by a central processor unit (CPU) 22 control a rack circuit 34 and a dispenser circuit 32 through a station program unit (SPU) 38 and arming monitor SPU 36 located in pylon 12, shown in dotted outlines in FIGS. 2 and 3.

When the above system was used in the training mode to release practice training bombs, indicators on stores control panel 24 and monitor and control panel 26 such as stores present did not extinguish for a proper period of time such as ten seconds when the store was released. This caused the training to appear artificial in the cockpit since required indicators did not function as required. The goal of any training is to provide the greatest amount of realism without endangering equipment or personnel.

Figure 3:
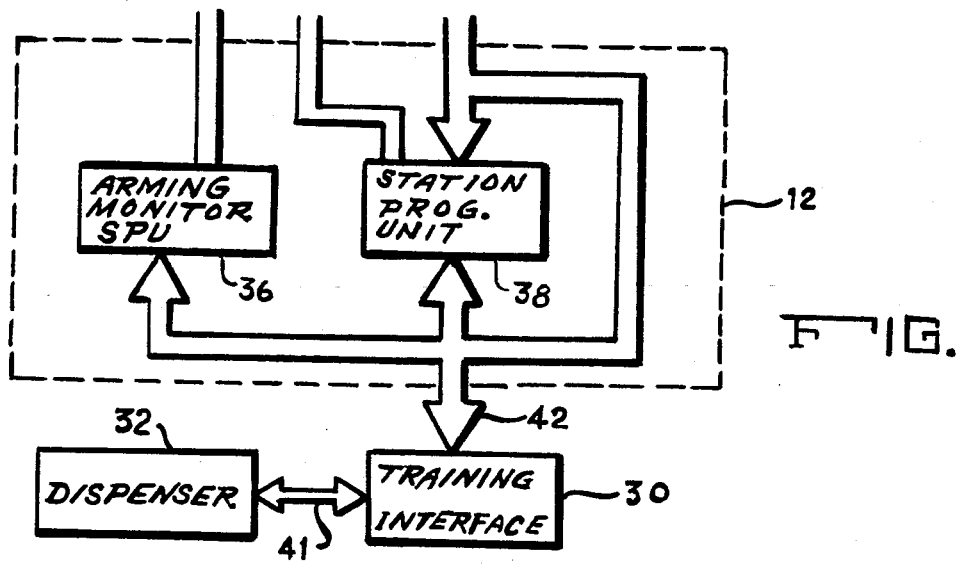
FIG. 3 illustrates by functional block diagram a training interface device of this invention connected into the electronic system disclosed in FIG. 2.

In order to correct these deficiencies, a training interface device 30 as shown in FIG. 3 is connected into release system 20. A modified dispenser cable 41 is connected between training interface device 30 and dispenser circuit 32 and a rack cable 42 from pylon 12 is connected to training interface 30 rather than rack 34 as shown in FIG. 2.

In order to operate training interface device 30, one must first establish all criteria needed for weapon arming and release.

On stores control panel 24, the following switches, not shown, must be selected or depressed.

| a. MASTER SW | ON/CPU Enable |
|---|---|
| b. DELIVERY MODE SW | BOMB OR AUX |
| Note: BOMB used in flight/AUX used on ground | |
| c. SELECT MODE | NUC WPN |
| d. STATION SELECT SW | DEPRESSED FOR STATION |
| Note: Legend and number on | UNDER TEST |
| e. RELEASE ENABLE/INHIBIT SW | REL Enable |
| f. RELEASE BUTTON | DEPRESSED |

Note: e. and f. are not actuated at this time. The simulator plug must be installed on each arming monitor SPU 36 to simulate nuclear weapons loaded at nuclear stations.

Note: e. and f. are not actuated at this time. The simulator plug must be installed on each arming monitor SPU 36 to simulate nuclear weapons loaded at nuclear stations.

On monitor and control panel 26 the following switches, not shown, must be selected or depressed:

| a. OPTION SELECT | GND RETARD or any other burst option |
|---|---|
| b. MONITOR & RELEASE | STATION UNDER TEST |

Note: Burst option lamps do not illuminate at this time. Safe light is on.

On miscellaneous control panel 28, the following switches, not shown, must be selected or depressed:

| a. NUC CONSENT SW (ARM & REL OR REL ONLY) | ARM & REL |
|---|---|
| Note: Lights displayed on monitor and control panel 26 for a burst option and and release station are illuminated. | |
| b. PROPER INDICATIONS | |
| (1) GRD RETARD | ON |
| (2) UNLOCK | ON |
| (3) ARM | ON |
| (4) SAFE | OFF |

On stores control panel 24, the following switch must be depressed:

| REL ENABLE/INHIBIT SW | REL ENABLE |
|---|---|

The REL ENABLE SW provides the grounds for completing the electrical circuit for energizing the relays located in SPU 38.

To arm and release, one must depress the release button on stores control panel 24, or on an auxiliary gauge panel, not shown, CPU 22 on receiving the pulse from this button energizes the relays in SPU 38 for the station under test. Firing voltages are now present at line A and B on FIG. 4.

Figure 4:
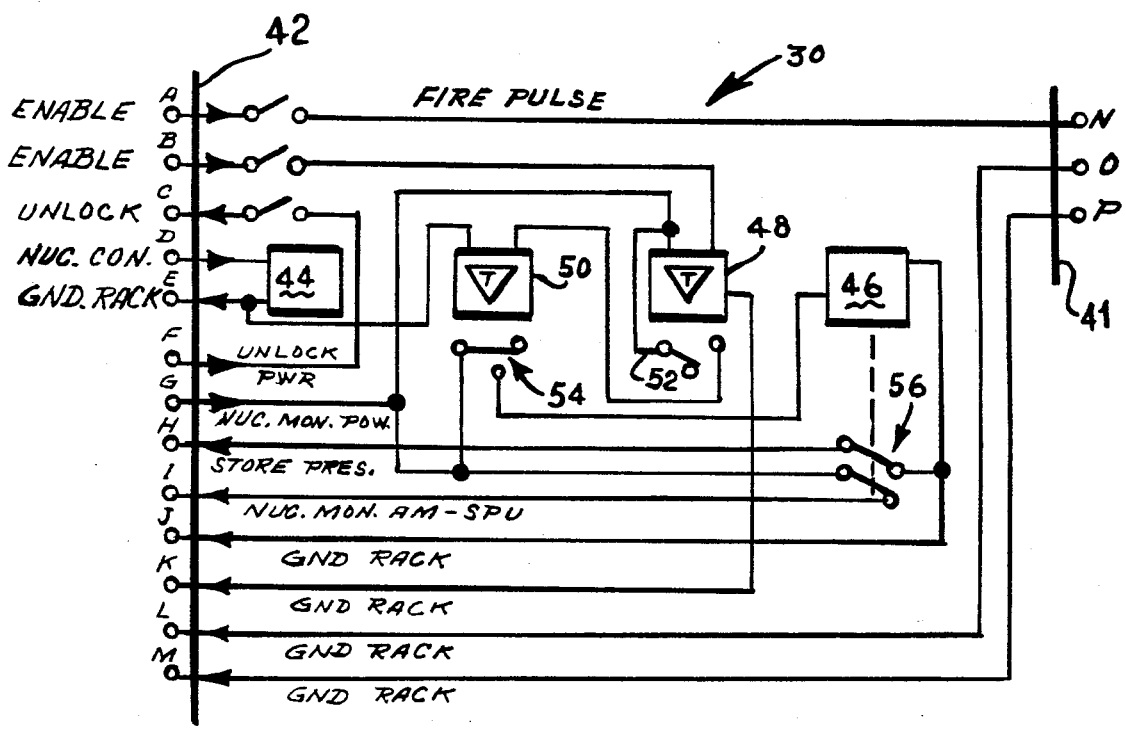
FIG. 4 illustrates by electrical schematic the training interface device shown in FIG. 3.

The electrical schematic of training interface device 30 is shown in FIG. 4 with the lines from modified dispenser cable 41 and rack cable 42.

Referring to FIG. 4, modified dispenser cable 41 has a line N for receiving a fire pulse to advance the stepper, not shown, and to release store 18, a line 0 and a line P that are grounded to rack cable 42. The direction of arrows attached to the lines on the left side of training interface device 30 indicate direction of information or power flow.

Rack cable 42 has a plurality of lines connected to training interface device 30 such as a line A that applies 28 volt power from station program unit 38 in response to the station selector actuation on stores control panel 24 and CPU 22. These switches acting through CPU 22 cause CPU 22 to output a signal to energize station program unit 38. Station program unit 38 and arming monitor station program unit 36 are interface units contained in each pylon 12. Station program unit 38 is essentially a switching device for isolating arming and release signals from rack 34. Arming monitor station program unit 36 is also essentially a switching device to monitor the presence of weapons at each station and to preselect and monitor a burst/safe option selected.

Referring to FIG. 4, the firing voltage applied to line A steps and fires dispenser 32 when attached to rack 34. At the same time, the voltage applied to line B triggers time delay third and fourth relays 48 and 50, respectively; third relay 48 energizes when the firing pulse is issued. Third relay 48 is a variable relay which can be adjusted from 1 to 10 second activation time. Herein, third relay 48 is set at 10 seconds. When third relay 48 is activated, a 10 second interrupt occurs in the system operation for only the selected station under test. Other stations are not effected and are able to arm and release when selected.

After third relay 48 energizes, fourth relay 50 is energized after approximately one second time delay. The one second delay in fourth relay 50 insures that the firing pulse passing through first relay 44 contacts have ample time to step and fire dispenser 32. Because the completion of the firing sequence is well within fourth relay 50 one second delay range, a high degree of reliability for a proper dispenser release is assured.

As fourth relay 50 is energized by third relay 48 through the closing of a switch 52, fourth relay 50 remains open for one second interval then a switch 54 closes. On the closing of switch 54, the nuclear monitor power of line G provides voltage to energize second relay 46. Second relay 46 simulates a rack sensing switch indicator and thus reflects stores present or away.

When second relay 46 is energized by fourth relay 50, switches 56 open thus simulating a rack release and weapon stores away. By opening switches 56 from the normally closed position the weapon status signal on line G and the stores present signal on line H previously used to illuminate indicators on monitor and control panel 26 and stores control panel 24 cause these indicators to extinguish for the remainder of the 10 second period. Third relay 48 when energized holds fourth relay 50 on after a 1 second delay. When third relay 48 deenergizes, third relay 48 recycles fourth relay 50 at the same time. This recycling insures that both third and fourth relay 48 and 50 are in synchronism and set for the next weapon arm and release sequence.

With dispenser 16 attached to rack 14 and training interface device 30 electrically connected from rack circuit 34 to dispenser circuit 32 as noted above, an increase from one release using an expensive training shape to six releases using inexpensive MKC-106 training bombs is achieved.

Although training interface 30 has been successfully tested on training missions requiring the dropping of practice training bombs other limitations do exist. No short range air-to-air missiles or external fuel tanks can be carried on the pylons with training interface device 30 installed therein. Training interface device 30 does not provide actual bombs away indication for stores on dispenser 32 and further a physical check of the store spot on dispenser 32 is required to determine actual load status. Further, no jettison capability is available on dispenser 32 since electrical connections to rack 14 is non existent because of training interface device 30. It has been further determined that if pylon jettison, station jettison, or weapon jettison is used, one store will be released from the selected dispenser.

Clearly, many modifications and variations of the present invention are possible in light of the above teachings and it is therefore understood, that within the inventive scope of the inventive concept, the invention may be practiced otherwise than specifically claimed.

What is claimed is:

1. A training interface device electrically connected between an ejector rack cable and a dispenser cable, said training interface device for use on an FB-111 aircraft during simulated nuclear bombing flights using conventional non-nuclear practice stores whereby cockpit indications and actions are similar to flights using conventional nuclear practice stores, said training interface device comprising:

a first relay for imitating the unlocking of a solenoid in a rack attached to a pylon of said aircraft, said first relay being activated by a station program unit in response to a computer output, said first relay having a first switch for connecting station program unit power to a dispenser for releasing stores, a second switch for connecting a weapon power line to said dispenser, and a third switch for connecting an unlocking monitor line to power, said switches closing in unison upon actuation of said first relay;

a second relay for imitating a sensing switch in said rack for indicating stores present and away indications in the cockpit, said second relay being actuated by power from said rack cable, said second relay having a first switch for disconnecting an identification line associated with stores present, and a second switch for interrupting power to an arming monitor station program unit, said switches acting in unison upon actuation of said second relay;

a third relay having time delay means therein for controlling indicator illumination upon stores away, said third relay being actuated by said first relay, upon activation of said third relay, a switch therein providing power on an output line during a fixed period of time; and a fourth relay having time delay means therein, said fourth relay providing power to said second relay after a fixed period of time upon actuation of said fourth relay by said third relay.

2. A training interface device as defined in claim 1 wherein said third relay has a time delay of about 10 seconds and said fourth relay has a time delay of about one second.

* * * * *